United States Patent
Mun et al.

(10) Patent No.: US 8,427,602 B2
(45) Date of Patent: Apr. 23, 2013

(54) BACKLIGHT UNIT PROVIDING POLARIZED LIGHT AND DISPLAY APPARATUS EMPLOYING THE SAME

(75) Inventors: Yong-kweun Mun, Yongin-si (KR); Hong-seok Lee, Seongnam-si (KR); Yoon-sun Choi, Incheon (KR); Hoon Song, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 364 days.

(21) Appl. No.: 12/585,577

(22) Filed: Sep. 18, 2009

(65) Prior Publication Data

US 2010/0157200 A1 Jun. 24, 2010

(30) Foreign Application Priority Data

Dec. 23, 2008 (KR) .................. 10-2008-0132205

(51) Int. Cl.
*G02F 1/1335* (2006.01)

(52) U.S. Cl.
USPC .............................................. 349/65; 349/98

(58) Field of Classification Search .............. 349/65
See application file for complete search history.

(56) References Cited

U.S. PATENT DOCUMENTS

| | | | |
|---|---|---|---|
| 4,798,448 A | | 1/1989 | Van Raalte |
| 5,729,311 A | | 3/1998 | Broer et al. |
| 5,828,488 A | | 10/1998 | Ouderkirk et al. |
| 5,856,855 A | * | 1/1999 | Mol et al. .................. 349/65 |
| 6,104,454 A | | 8/2000 | Hiyama et al. |
| 6,129,439 A | * | 10/2000 | Hou et al. ................ 362/626 |
| 6,210,012 B1 | * | 4/2001 | Broer ........................ 362/84 |
| 6,545,734 B2 | | 4/2003 | Cornelissen et al. |
| 7,969,531 B1 | * | 6/2011 | Li et al. ..................... 349/65 |
| 2003/0058383 A1 | | 3/2003 | Jagt et al. |
| 2003/0190504 A1 | | 10/2003 | Fisher et al. |
| 2004/0265510 A1 | | 12/2004 | Miroshin et al. |
| 2005/0094295 A1 | * | 5/2005 | Yamashita et al. ......... 359/833 |
| 2006/0203511 A1 | * | 9/2006 | Tseng ...................... 362/608 |
| 2007/0252923 A1 | * | 11/2007 | Hwang et al. .............. 349/65 |
| 2008/0316396 A1 | * | 12/2008 | Horikoshi et al. .......... 349/96 |
| 2009/0091949 A1 | * | 4/2009 | Lee et al. ................ 362/620 |

* cited by examiner

*Primary Examiner* — Eric Wong
(74) *Attorney, Agent, or Firm* — Harness, Dickey & Pierce, P.L.C.

(57) ABSTRACT

Example embodiments relate to a backlight unit and a display apparatus employing the same. The backlight unit may include a light source; a polarization conversion unit configured to convert polarization of light incident from the light source; and a light guide plate configured to emit light incident through the polarization conversion unit. The light guide plate may include a plurality of light emitting portions configured to emit light through specular reflection. The light polarized by the polarization conversion unit may maintain its polarization state when it is subsequently emitted from the light guide plate.

24 Claims, 7 Drawing Sheets

BACKLIGHT UNIT PROVIDING POLARIZED LIGHT AND DISPLAY APPARATUS EMPLOYING THE SAME

CROSS-REFERENCE TO RELATED APPLICATION

This application claims priority under 35 U.S.C. §119 to Korean Patent Application No. 10-2008-0132205, filed on Dec. 23, 2008 with the Korean Intellectual Property Office, the disclosure of which is incorporated herein in its entirety by reference.

BACKGROUND

1. Field

Example embodiments relate to a backlight unit and a display apparatus employing the same.

2. Description of the Related Art

Liquid crystal displays (LCDs) have a structure wherein about half the amount of light supplied by a backlight unit may be absorbed by a polarization plate under an LCD panel as a result of a method of adjusting gray scale using a polarized state of incident light. Such a method may cause problems, including inefficient use of energy, deterioration of materials due to heat generated by absorbed light, and limitations with regard to brightness. One potential solution to these problems may be to increase light efficiency in the LCD.

As a design solution for these problems, various polarization recycling structures for re-using a portion of light that is absorbed by the polarization plate have been proposed. One proposal is to use a dual brightness enhancement film (DBEF) film developed by 3M company for such a purpose. However, a DBEF film may be relatively expensive, thus increasing costs. In addition, optical films (e.g., polarization plates used on both sides of a display) may add considerably to the cost of the panel. Furthermore, costs will increase with the size of a display.

SUMMARY

Example embodiments relate to a backlight unit with increased light efficiency and a display apparatus employing the same. A backlight unit may include a light source; a polarization conversion unit configured to convert polarization of light incident from the light source; and a light guide plate having a light guide portion and a plurality of light emitting portions protruding from an upper surface of the light guide portion, the light guide portion configured to reflect light incident through the polarization conversion unit within the light guide portion and the light emitting portions configured to emit light through specular reflection. The light guide portion and the light emitting portions may be formed as a single body or by optical coupling.

The polarization conversion unit may include an absorption type polarizer configured to transmit a first polarized light from the light source and to absorb a second polarized light perpendicular to the first polarized light.

Another polarization conversion unit may include a reflective polarizer configured to transmit a first polarized light from the light source such that the transmitted first polarized light is incident on the light guide portion and to reflect a second polarized light perpendicular to the first polarized light; a polarization rotator configured to convert the reflected second polarized light into the first polarized light and disposed such that the converted first polarized light is incident on the light guide portion; and a light path conversion member configured to alter a light path of the second polarized light reflected by the reflective polarizer such that the reflected second polarized light is incident on the polarization rotator.

Another polarization conversion unit may include a reflective polarizer configured to transmit a first polarized light from the light source such that the transmitted first polarized light is incident on the light guide portion and to reflect a second polarized light perpendicular to the first polarized light; a quarter wave plate arranged parallel to a surface of the reflective polarizer from which the second polarized light is reflected, the quarter wave plate arranged such that the reflected second polarized light is incident thereon; and a reflection member arranged parallel to the quarter wave plate and configured to reflect light transmitted through the quarter wave plate such that the reflected light is incident on the quarter wave plate.

Another polarization conversion unit may include a first reflective polarizer configured to transmit a first polarized light from the light source such that the transmitted first polarized light is incident on the light guide portion and to reflect a second polarized light perpendicular to the first polarized light; a second reflective polarizer configured to transmit the second polarized light reflected by the first reflective polarizer such that the second polarized light is incident on the light guide portion and to reflect the first polarized light; a quarter wave plate on which the second polarized light transmitted by the second reflective polarizer is incident; and a reflection member arranged parallel to the quarter wave plate and configured to reflect light transmitted through the quarter Wave plate such that the reflected light is incident on the quarter wave plate.

Another polarization conversion unit may include a reflective polarizer configured to transmit a first polarized light from the light source such that the transmitted first polarized light is incident on the light guide portion and to reflect a second polarized light perpendicular to the first polarized light; a scattering guide member interposed between the light source and the reflective polarizer such that the second polarized light reflected by the reflective polarizer is incident on the scattering guide member, a predetermined area of a side of the scattering guide member that faces the light source being formed as an opening through which light from the light source is incident and a remaining area of the side of the scattering guide member being formed as a scattering reflection pattern portion which scatters and reflects the second polarized light reflected by the reflective polarizer; and a focusing lens configured to focus light such that the light from the light source is incident on the scattering guide member through the opening.

Another polarization conversion unit may include a reflective polarizer configured to transmit a first polarized light from the light source such that the transmitted first polarized light is incident on the light guide portion and to reflect a second polarized light perpendicular to the first polarized light; and a polyhedral scattering guide member having a first side on which the light from the light source is incident, a second side on which the second polarized light reflected by the reflective polarizer is incident, a third side that includes a scattering reflection pattern portion for scattering and reflecting the second polarized light reflected from the second side, and a plurality of reflective sides.

Another polarization conversion unit may include a polarizing conversion polyhedron having an incident side on which light from the light source is incident, a polarization splitting side at which light incident through the incident side is split into a first polarized light and a second polarized light; and a plurality of reflective sides at which the second polarized light split at the polarization splitting side is reflected a plurality of times so as to be converted into the first polarized light.

A display apparatus may include the backlight unit according to example embodiments; and a liquid crystal display (LCD) panel configured to form an image by modulating light emitted from the backlight unit.

BRIEF DESCRIPTION OF THE DRAWINGS

The above and/or other aspects of example embodiments may become more apparent and readily appreciated upon review of the following detailed description in conjunction with the accompanying drawings of which.

DETAILED DESCRIPTION

Figure 1:
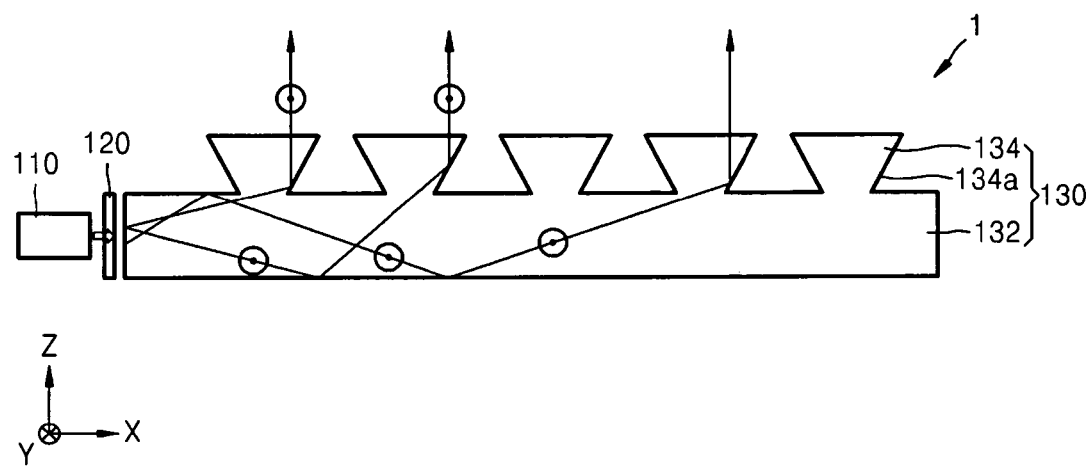
FIG. 1 is a cross-sectional view of a backlight unit according to example embodiments.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view of a backlight unit 1 according to example embodiments. Referring to FIG. 1, the backlight unit 1 may include a light source 110, a polarization conversion unit 120, and a light guide plate 130. The light guide plate 130 includes a light guide portion 132 and a plurality of light emitting portions 134 which protrude from an upper surface of the light guide portion 132. The light guide portion 132 may reflect light incident through the polarization conversion unit 120. The light emitting portions 134 may emit light incident from the light guide portion 132 through specular reflection. Each of the light emitting portions 134 may include a plurality of side surfaces 134a that facilitate specular reflection. Each light emitting portion 134 may maintain a polarized state of the light incident through the polarization conversion unit 120 when emitting light.

The light guide portion 132 and each light emitting portion 134 may be formed as a single body. For example, there may be no optical boundary or physical boundary between the light guide portion 132 and each light emitting portion 134. As a result, the light guide plate 130 may be referred to as an all-in-one type light guide plate 130. To realize this structure, the all-in-one type light guide plate 130 may be fabricated as a single body to emboss the shape of each light emitting portion 134 on a surface of the light guide portion 132. Alternatively, the light guide portion 132 and each light emitting portion 134 may be separately fabricated and connected to each other so that there is no optical boundary between the light guide portion 132 and each light emitting portion 134.

A cross-section of each light emitting portion 134 where the light is emitted may be larger than a cross-section where the light is incident from the light guide portion 132. Although the light emitting portions 134 are shown in FIG. 1 with a certain shape and distribution, it should be understood that other shapes and/or distributions may also be suitable. Each light emitting portion 134 may emit the light that is incident from the light source 110 disposed at a side of the light guide portion 132. In this case, each light emitting portion 134 may have any shape wherein a polarized state of incident light may be maintained and light may be emitted. For example, the density of light emitting portions 134 may increase with the distance from the light source 110. Stated more clearly, the number of light emitting portions 134 that are disposed farther away from the light source 110 may be greater than the number of light emitting portions 134 that are disposed closer to the light source 110. As a result, the brightness of the light emitted from the all-in-one type light guide plate 130 may be more uniform. Also, light emitting portions 134 farther away from the light source 110 may be larger in size than light emitting portions 134 closer to the light source 110. Furthermore, it should be understood that the cross-sectional shape of each light emitting portion 134 is not limited to the inverse trapezoidal shape shown in FIG. 1. Rather, the shape and/or distribution of each light emitting portion 134 may be determined based on the type of the light source 110.

The all-in-one type light guide plate 130 may be formed of a transparent and flexible material (e.g., polydimethylsiloxane). The light source 110 may be disposed at a side of the all-in-one type light guide plate 130. The light source 110 may be a point light source (e.g., a light emitting diode (LED)) or a line light source (e.g., a cold cathode fluorescent lamp (CCFL)). Also, a plurality of point light sources may be used, or a unit for converting point light into linear light may be used together with a point light source.

The polarization conversion unit 120 may be interposed between the light source 110 and the all-in-one type light guide plate 130 to facilitate the conversion of the polarization state of light that is incident from the light source 110 into a predetermined linear polarization state. For example, the polarization conversion unit 120 may convert light incident from the light source 110 into linear polarized light having a direction parallel to the side surfaces 134a of the light emitting portions 134. The polarization conversion unit 120 may be a general absorption type polarizer which transmits incident, first polarized light (e.g., S-polarized light) and absorbs second polarized light perpendicular to the first polarized light (e.g., P-polarized light).

The backlight unit 1 having the above structure may realize a relatively high polarization ratio when emitting polarized light, because the backlight unit 1 has a structure that facilitates the maintenance of a polarized state of incident light when the all-in-one type light guide plate 130 emit's the light incident from the light source 110 (unlike in the case of a general light guide plate). Stated more clearly, when the light incident from the light source 110 is reflected inside the light guide potion 132 and is emitted, reflection by scattering patterns that disturb polarized light does not occur. Instead, specular reflection by smooth surfaces occurs. Thus, the polarized state of the light beam is not changed when the beam direction is changed. As illustrated in FIG. 1, light emitted from the light source 110 is changed into S-polarized light by the polarization conversion unit 120, and the S-polarized light is incident on the all-in-one type light guide plate 130. The incident light is maintained as S-polarized light and is emitted by the light emitting portions 134. Thus, the relatively high polarization ratio of the backlight unit 1 may be maintained to be almost the same as a polarization ratio of a polarization plate employed as the polarization conversion unit 120. In addition, such a configuration is more efficient than an arrangement in which a relatively expensive polarization plate is separately disposed on the all-in-one type light guide plate 130 to provide polarized light.

FIGS. 2 through 11 relate to other backlight units according to example embodiments that provide polarized light, have a relatively high polarization ratio, and have a relatively high light efficiency. Like elements already discussed above in connection with FIG. 1 may have been omitted below for purposes of brevity. Rather, the discussion below will focus on new structures and/or variations thereof (e.g., polarization conversion unit) that have not been previously discussed above.

Figure 2:
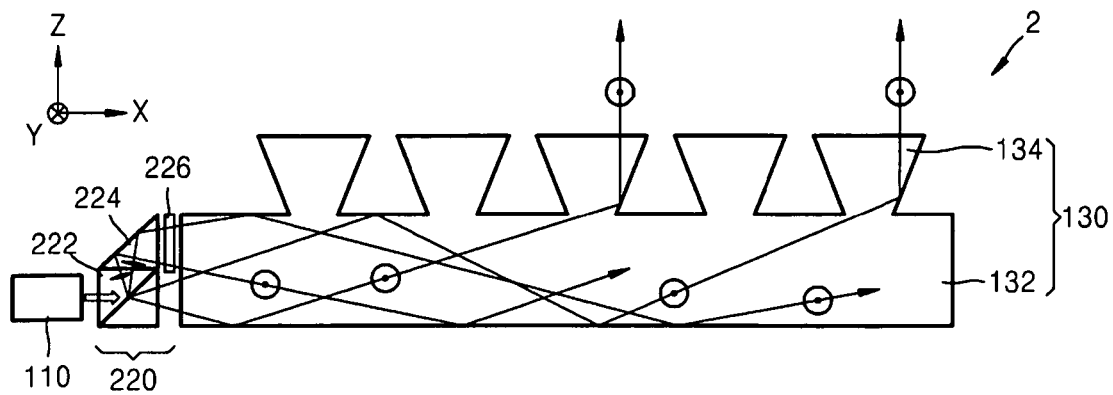
FIG. 2 is a cross-sectional view of another backlight unit according to example embodiments.

FIG. 2 is a cross-sectional view of a backlight unit 2 according to example embodiments. The backlight unit 2 may differ from the backlight unit 1 of FIG. 1 in terms of the structure of the polarization conversion unit 220. The polarization conversion unit 220 may have a structure wherein, when the polarization state of light emitted from the light source 110 is converted, the unconverted components of the light may be re-used to improve light efficiency. The polarization conversion unit 220 may include a reflective polarizer 222 which transmits a first polarized light from the light emitted from the light source 110 and reflects second polarized light that is perpendicular to the first polarized light, a polarization rotator 226 which converts the second polarized light reflected by the reflective polarizer 222 into the first polarized light, and a light path conversion member 224 which is disposed between the reflective polarizer 222 and the polarization rotator 226 and changes a path of the light reflected by the reflective polarizer 222.

The light source 110 may be a plurality of point light sources, as described in FIG. 1. For example, a plurality of polarization conversion units 220 may be associated with a plurality of light sources 110 such that the polarization conversion units 220 and the light sources 110 form pairs. The plurality of light sources 110 and the plurality of polarization conversion units 220 may be disposed along a side surface of the all-in-one type light guide plate 130 (e.g., along the Y-direction indicated in FIG. 2).

The reflective polarizer 222 splits the light emitted from the light source 110 into a first polarized light and a second polarized light. The reflective polarizer 226 may be disposed such that the first polarized light is incident on the all-in-one type light guide plate 130 and the optical axis of the second polarized light is perpendicular to an upper surface of the light guide portion 132 (from which the light emitting portions 134 protrude). The reflective polarizer 222 may be a cube type polarizing beam splitter as illustrated in FIG. 2. Alternatively, the reflective polarizer 222 may be a wire grid polarizer or a dual brightness enhancement film (DBEF).

The light path conversion member 224 changes a path of the second polarized light reflected by the reflective polarizer 222 toward the polarization rotator 226. The light path conversion member 224 may be a prism as illustrated in FIG. 2. Alternatively, the light path conversion member 224 may be a mirror member having a reflective surface that changes a light path. The light path conversion member 224 (e.g., prism) may be bonded to the top side of the reflective polarizer 222 (e.g., cube type polarizing beam splitter). The polarization rotator 226 rotates the polarization of incident light. For example, the polarization rotator 226 may convert the second polarized light into the first polarized light. The polarization rotator 226 may be a twisted nematic liquid crystal film.

In the polarization conversion unit 220, most of the light emitted from the light source 110 may be changed into the first polarized light and may be incident on the all-in-one type light guide plate 130. Also, the first polarized light that is incident on the all-in-one type light guide plate 130 may be maintained in a polarized state and emitted through specular reflection by each of the light emitting portions 134.

Figure 3:
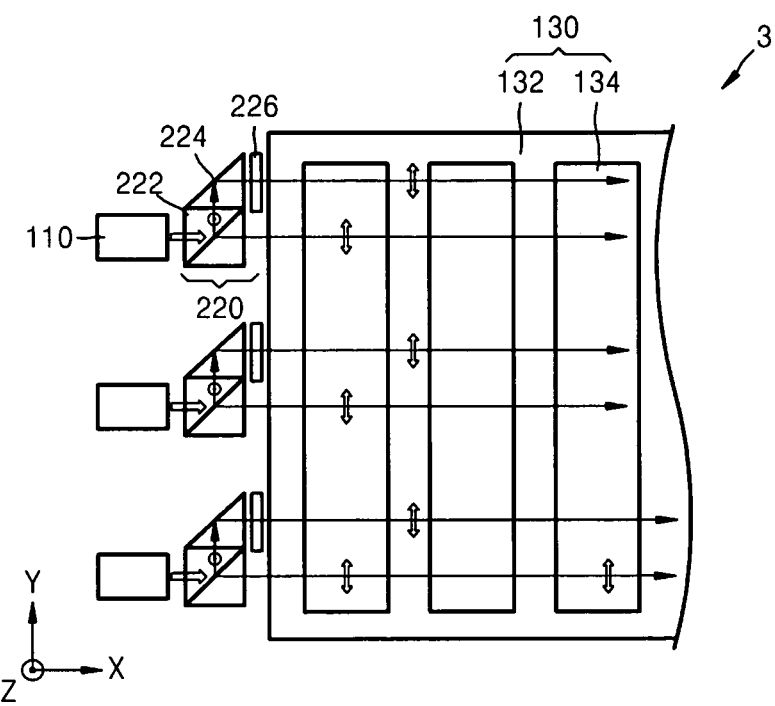
FIG. 3 is a plan view of another backlight unit according to example embodiments.

FIG. 3 is a plan view of a backlight unit 3 according to example embodiments. The backlight unit 3 may employ the same polarization conversion unit 220 as that of the backlight unit 2 of FIG. 2. The main difference is its arrangement in relation to the all-in-one type light guide plate 130. The polarization conversion unit 220 includes the reflective polarizer 222, the light path conversion member 224, and the polarization rotator 226. The reflective polarizer 222 splits the light emitted from the light source 110 into a first polarized light and a second polarized light. The reflective polarizer 222 is disposed such that the first polarized light is incident on the all-in-one type light guide plate 130 and the optical axis of the second polarized light is parallel to the upper surface of the light guide portion 132. In FIG. 3, the polarization conversion unit 220 is substantially the same as that of FIG. 2 in that most of the light emitted from the light source 110 is changed into the first polarized light and is incident on the all-in-one type light guide plate 130. The incident light is also maintained in the same polarized state when the light is emitted from the all-in-one type light guide plate 130. The arrangement of FIG. 3 may be appropriate for further reducing the thickness of a backlight unit compared to FIG. 2.

Figure 4:
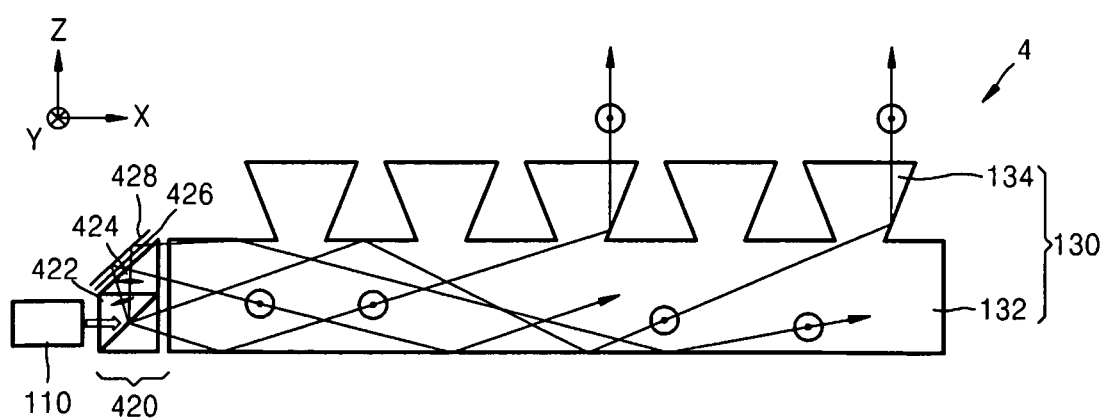
FIG. 4 is a cross-sectional view of another backlight unit according to example embodiments.

FIG. 4 is a cross-sectional view of a backlight unit 4 according to example embodiments. The polarization conversion unit 420 may include a reflective polarizer 422 which transmits a first polarized light from the light emitted from the light source 110 and reflects a second polarized light that is perpendicular to the first polarized light, a quarter wave plate 426 (disposed to be parallel to a surface Of the reflective polarizer 422 from which light is reflected) which changes a phase of the incident light, and a reflection member 428 which is disposed to be parallel to the quarter wave plate 426 and reflects light transmitted through the quarter wave plate 426 so as to be incident on the quarter wave plate 426.

The reflective polarizer 422 splits the incident light into the first polarized light and the second polarized light. The reflective polarizer 422 is disposed such that the first polarized light is directed to the all-in-one type light guide plate 130 and an optical axis of the second polarized light is perpendicular to an upper surface of the light guide portion 132 (from which the light emitting portions 134 protrude). The reflective polarizer 422 may be a cube type polarizing beam splitter as illustrated in FIG. 4. Alternatively, the reflective polarizer 422 may be a wire grid polarizer or a dual brightness enhancement film (DBEF).

The quarter wave plate 426 may cause a quarter wavelength phase shift in the incident light. For instance, the path of the second polarized light may sequentially include the quarter wave plate 426 (first pass), the reflection member 428, and the quarter wave plate 426 (second pass). Thus, the second polarized light may pass through the quarter wave plate 426 twice and be converted into the first polarized light prior to being incident on the all-in-one type light guide plate 130.

A prism 424 may be further interposed between the reflective polarizer 422 and the quarter wave plate 426. The prism 424 may be bonded to a top side of the reflective polarizer 422 (e.g., cube type polarizing beam splitter), and the quarter wave plate 426 and the reflection member 428 may be parallel to a diagonal surface of the prism 424.

Figure 5:
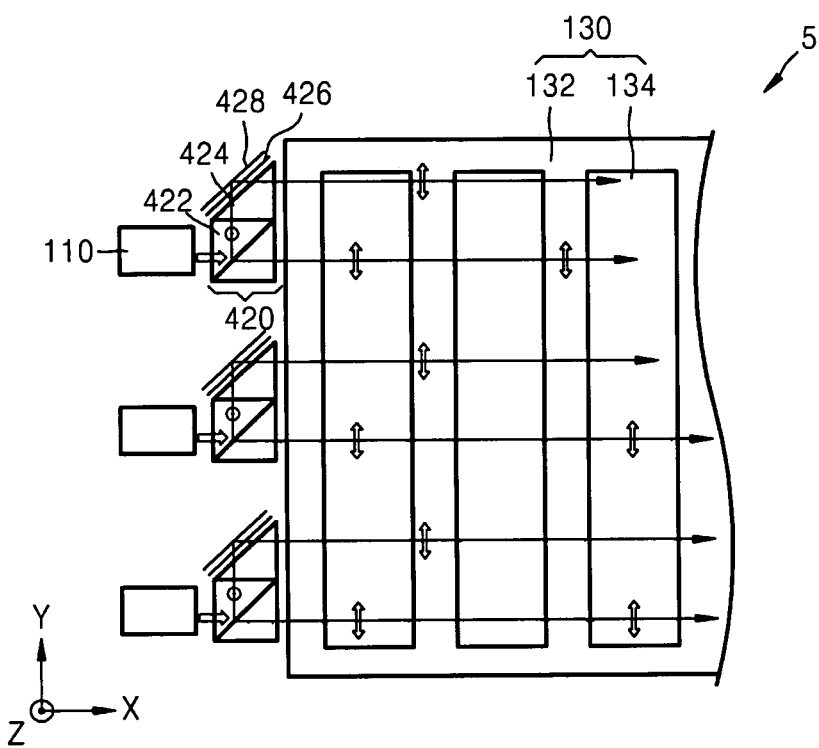
FIG. 5 is a plan view of another backlight unit according to example embodiments.

FIG. 5 is a plan view of a backlight unit 5 according to example embodiments. Although the structure of the polarization conversion unit 420 of FIG. 5 may be the same, as the polarization conversion unit 420 of the backlight unit 4 of FIG. 4, the main difference is in terms of its arrangement. The reflective polarizer 422 splits the incident light into a first polarized light and a second polarized light. The reflective polarizer 422 is disposed such that the first polarized light is directed to the all-in-one type light guide plate 130 and an optical axis of the second polarized light is parallel to an upper surface of the light guide portion 132. The backlight unit of FIG. 5 may be the same as that of FIG. 4 in that most of the light emitted from the light source 110 is changed into the first polarized light and is incident on the all-in-one type light guide plate 130. The light emitted from the all-in-one type light guide plate 130 is also maintained in the first polarized state. The arrangement of FIG. 5 may be appropriate for further reducing the thickness of the backlight unit compared to FIG. 4.

Figure 6:
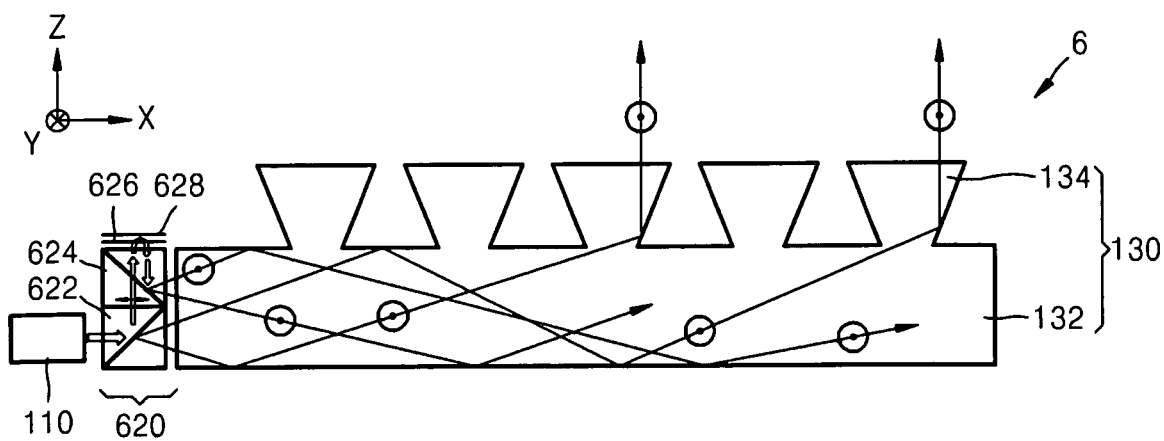
FIG. 6 is a cross-sectional view of another backlight unit according to example embodiments.

FIG. 6 is a cross-sectional view of a backlight unit 6 according to example embodiments. The polarization conversion unit 620 includes a first reflective polarizer 622 which transmits a first polarized light of the light emitted from the light source 110 and reflects second polarized light that is perpendicular to the first polarized light, a second reflective polarizer 624 which transmits the second polarized light reflected by the first reflective polarizer 622 and reflects the first polarized light, a quarter wave plate 626 on which the second polarized light transmitted by the second reflective polarizer 624 is incident, and a reflection member 628 which is disposed to be parallel to the quarter wave plate 626 and reflects the light transmitted through the quarter wave plate 626 so as to be incident on the quarter wave plate 626.

The first reflective polarizer 622 splits the incident light into the first polarized light and the second polarized light. The first reflective polarizer 622 is disposed such that the first polarized light is directed to the all-in-one type light guide plate 130 and an optical axis of the second polarized light is perpendicular to an upper surface of the light guide portion 132 (from which the light emitting portions 134 protrude).

The second reflective polarizer 624 splits the incident light into the first polarized light and the second polarized light by using a principle of reflecting the first polarized light and transmitting the second polarized light. Most of the light that is incident on the second reflective polarizer 624 from the first reflective polarizer 622 is the second polarized light and is transmitted through the second reflective polarizer 624. The path of the second polarized light may include the quarter wave plate 626 (first pass), the reflection member 628, and the quarter wave plate 626 (second pass). As a result, the second polarized light is converted into the first polarized light and is incident on the second reflective polarizer 624. The converted first polarized light is reflected by the second reflective polarizer 624 so as to be incident on the all-in-one type light guide plate 130.

Figure 7:
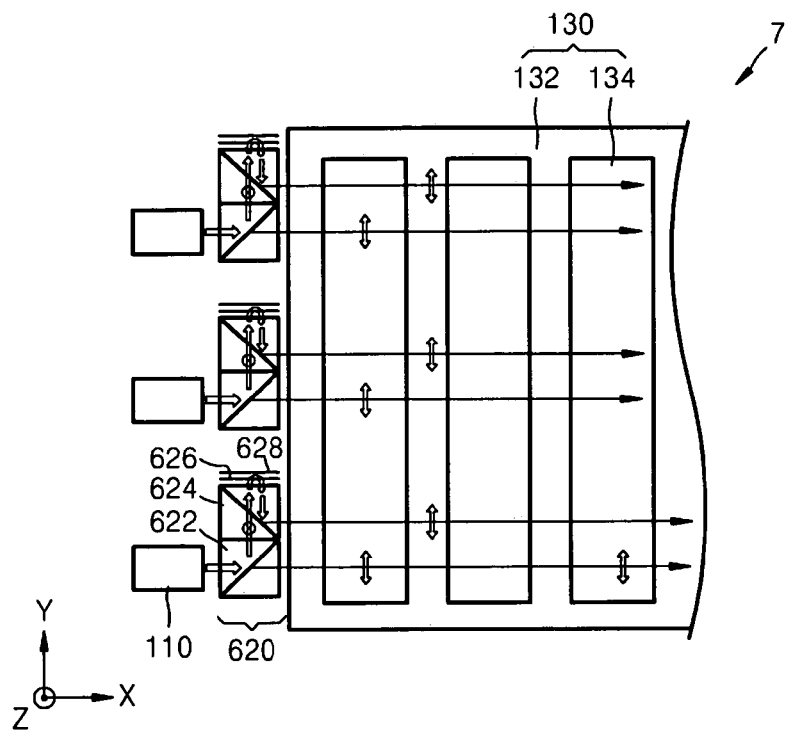
FIG. 7 is a plan view of another backlight unit according to example embodiments.

FIG. 7 is a plan view of a backlight unit 7 according to example embodiments. Although the structure of the polarization conversion unit 620 of FIG. 7 may be the same as the polarization conversion unit 620 of the backlight unit 6 of FIG. 6, the main difference is in terms of its arrangement. In FIG. 7, the optical axis of second polarized light that is reflected by the first reflective polarizer 622 is parallel to an upper surface of the light guide portion 132. Thus, the arrangement of FIG. 7 may be appropriate for further reducing the thickness of a backlight unit compared to FIG. 6.

Figure 8:
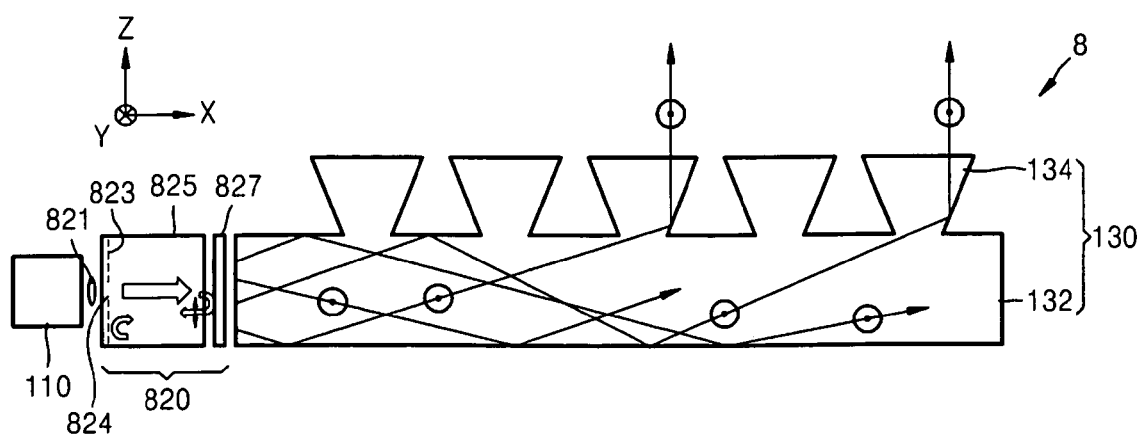
FIG. 8 is a cross-sectional view of another backlight unit according to example embodiments.

FIG. 8 is a cross-sectional view of a backlight unit 8 according to example embodiments. The polarization conversion unit 820 may include a reflective polarizer 827 which transmits a first polarized light from the light emitted from the light source 110 and reflects a second polarized light that is perpendicular to the first polarized light, a scattering guide member 825 which is interposed between the light source 110 and the reflective polarizer 827 and includes an opening 824 and a scattering-reflection pattern portion 823, and a focusing lens 821 which is interposed between the light source 110 and the scattering guide member 825.

The reflective polarizer 827 transmits the first polarized light of the incident light so as to be incident on the all-in-one type light guide plate 827 and reflects the second polarized light toward the scattering guide member 825. The reflective polarizer 827 may be a wire grid polarizer, a DBEF, or a multi-layer polarizing beam splitter.

Light that is not transmitted through the reflective polarizer 827 and is reflected is incident on the scattering guide member 825. A predetermined area of a side of the scattering guide member 825 that faces the light source 110 may be formed as the opening 824 on which light emitted from the light source 110 is incident, and the remaining area of the side may be formed as the scattering reflection pattern portion 823 which scatters and reflects the light reflected by the reflective polarizer 827. The scattering guide member 825 allows light that is incident through the opening 824 and light that is scattered by the scattering reflection pattern portion 823 to proceed toward the reflective polarizer 827. A side surface of the scattering guide member 825 may be formed as a reflective surface. Alternatively, an additional reflection member may be further disposed at the side surface of the scattering guide member 825 so that light is not emitted through the side surface of the scattering guide member 825.

The focusing lens 821 may be disposed to focus light such that the light emitted from the light source 100 is incident on the scattering guide member 825 through the opening 824. A focus of the focusing lens 821 may be formed approximately at a position of the opening 824. The light emitted from the light source 110 passes through the focusing lens 821 and is focused so as to be incident on the scattering guide member 825 through the opening 824. The focused light proceeds toward the reflective polarizer 827. The first polarized light is transmitted through the reflective polarizer 827 and is incident on the all-in-one light guide plate 130, and the second polarized light reflected by the reflective polarizer 827 is scattered and reflected by the scattering reflection pattern portion 823. As a result, the second polarized light is altered into various polarized components. Among the various polarized components, the first polarized light is transmitted through the reflective polarizer 827 and is incident on the all-in-one light guide plate 130, and the remaining polarized components are reflected. When the above process is repeated, most of the light emitted from the light source 110 may be changed into the first polarized light and directed so as to be incident on the all-in-one light guide plate 130.

Figure 9:
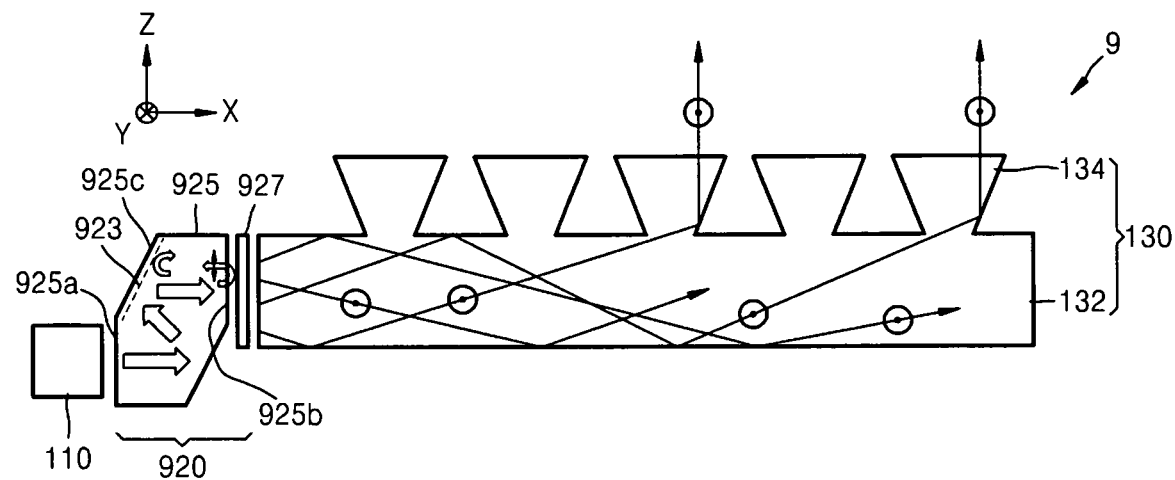
FIG. 9 is a cross-sectional view of another backlight unit according to example embodiments.

FIG. 9 is a cross-sectional view of a backlight unit 9 according to example embodiments. The principle of operation of the backlight unit 9 of FIG. 9 is similar to that of the backlight unit 8 of FIG. 8. The main difference is that the polarization conversion unit 920 of FIG. 9 is configured such that the focusing lens 821 of FIG. 8 is not needed. The polarization conversion unit 920 includes a reflective polarizer 927 which transmits a first polarized light from light emitted from the light source 110 and reflects a second polarized light perpendicular to the first polarized light, and a polyhedral scattering guide member 925 interposed between the light source 110 and the reflective polarizer 927.

The polyhedral scattering guide member 925 has a polyhedron shape including a first side 925a on which the light emitted from the light source is incident, a second side 925b on which light reflected by the reflective polarizer 927 is incident, and a third side 925c in which a scattering reflection pattern portion 923 for scattering and reflecting light is formed. The scattering guide member 925 may further include a plurality of reflective sides in addition to the first side 925a, the second side 925b, and the third side 925c.

The light emitted from the light source 110 is incident on the scattering guide member 925 through the first side 925a. The incident light may be reflected from a side surface of the scattering guide member 925, directed to the third side 925c, and scattered by the scattering reflection pattern portion 923. The scattered light may be reflected from another side surface of the scattering guide member 925 or may be incident on the reflective polarizer 927. The reflective polarizer 927 may transmit the first polarized light such that the light is incident on the all-in-one type light guide plate 130. The second polarized light may be reflected so as to be incident on the scattering guide member 925 through the second side 925b. The incident, second polarized light may be scattered by the scattering reflection pattern portion 923 so as to result in various polarized components. Among the various polarized components, the first polarized light may be transmitted through the reflective polarizer 927 so as to be incident on the all-in-one light guide plate 130. When the above process is repeated, most of the light emitted from the light source 100 may be changed into the first polarized light so as to be incident on the all-in-one light guide plate 130. Furthermore, the incident, first polarized light may be maintained in the polarized state when it is emitted from the all-in-one type light guide plate 130.

Figure 10:
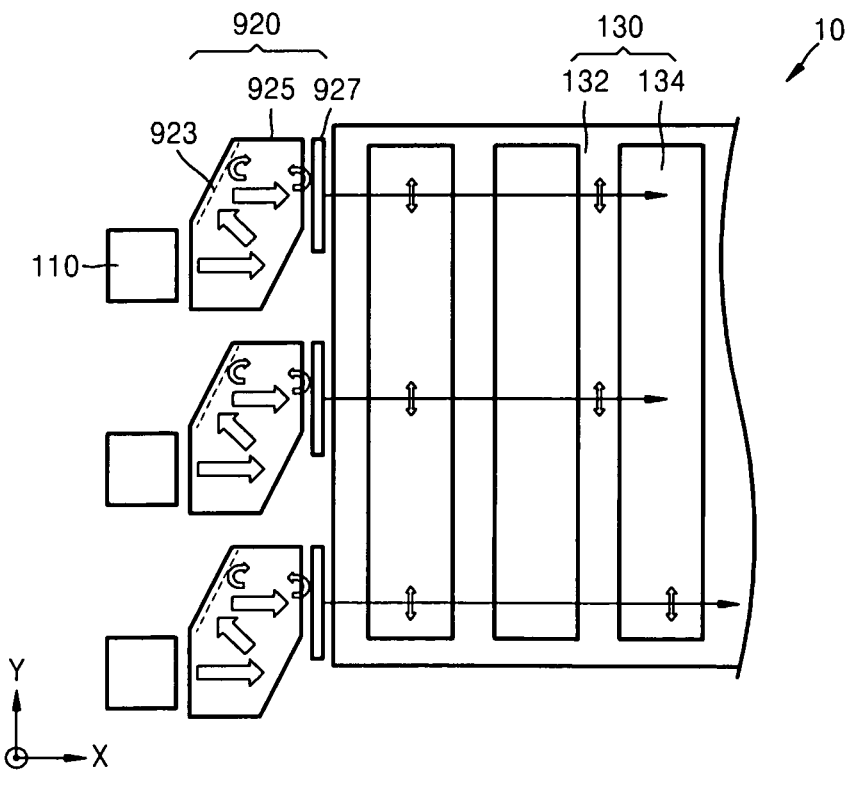
FIG. 10 is a plan view of another backlight unit according to example embodiments.

FIG. 10 is a plan view of a backlight unit 10 according to example embodiments. Although the structure of the polarization conversion unit 920 of FIG. 10 may be the same as the polarization conversion unit 920 of the backlight unit 9 of FIG. 9, the main difference is in terms of its arrangement, as illustrated in FIG. 10. As a result, the thickness of the backlight unit of FIG. 10 may be further reduced compared to FIG. 9.

Figure 11:
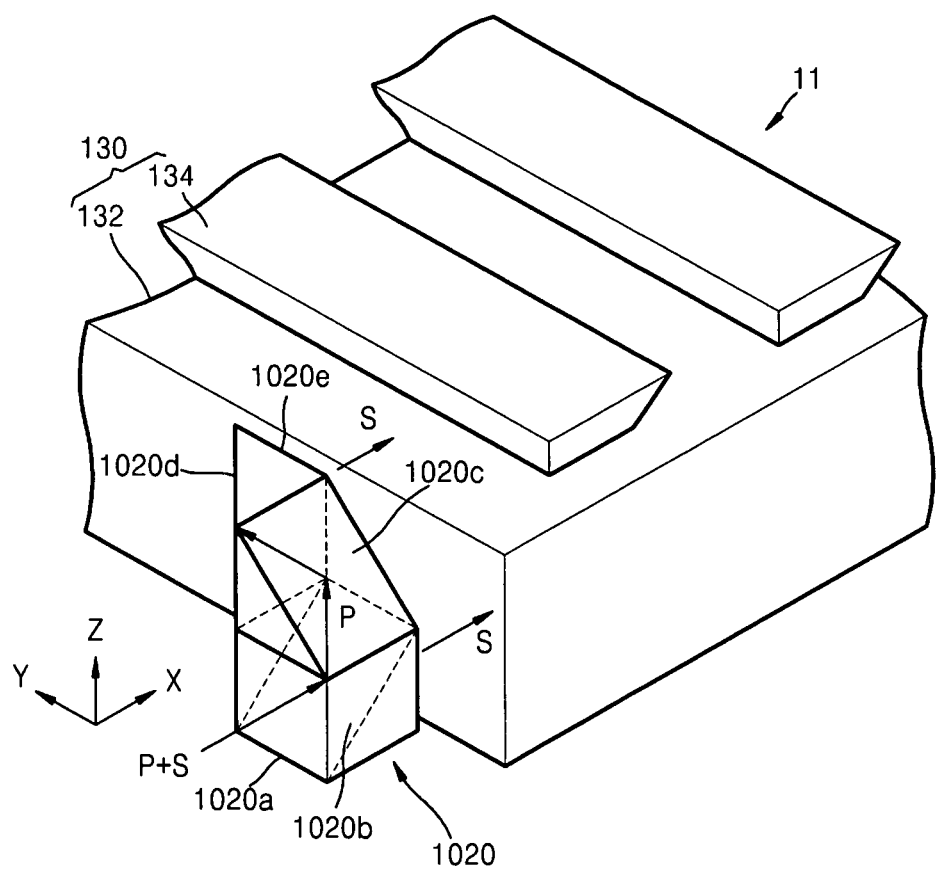
FIG. 11 is a perspective view of another backlight unit according to example embodiments.

FIG. 11 is a perspective view of a backlight unit 11 according to example embodiments. A polarization conversion unit 1020 may be formed as a polarizing conversion polyhedron including an incident side 1020a on which light is incident, a polarization splitting side 1020b at which light incident through the incident side 1020a is split into a first polarized light and a second polarized light, and a plurality of reflective sides 1020c, 1020d, and 1020e at which the first polarized light split at the polarization splitting side 1020b is reflected a plurality of times such that the reflected first polarized light is converted into the second polarized light.

For example, the polarizing conversion polyhedron may include a cube type polarizing beam splitter, a prism, and a triangular prism. The cube type polarizing beam splitter may transmit the first polarized light of the light incident through the incident side 1020a, reflect the second polarized light perpendicular to the first polarized light, and allow the transmitted light to be incident on the all-in-one light guide plate 130. The prism may be disposed at a side of the cube type polarizing beam splitter and whose side surface is formed at a position where a side surface of the cube type polarizing beam splitter extends. The triangular prism may share the side surfaces of the prism and the cube type polarizing beam splitter.

First polarized light S of the light incident through the incident side 1020a may be split at the polarization splitting side 1020b so as to be incident on the all-in-one light guide plate 130. When reflected from the plurality of reflective sides 1020c, 1020d, and 1020e, second polarized light P may be converted into the first polarized light S and directed so as to be incident on the all-in-one light guide plate 130. In FIG. 11, the first polarized light S may denote Y-direction polarized light. The first polarized light incident on the all-in-one type light guide plate 130 may be emitted through reflection at the side surfaces 134a parallel to the Y-direction. Thus, the first polarized light S may be maintained in the polarized state when is emitted from the all-in-one light guide plate 130. Although the light source 110 is not shown in FIG. 11, a plurality of point light sources may form pairs with a plurality of polarization conversion units 1020 and may be arranged along a side surface of the all-in-one light guide plate 130 (e.g., along the Y-direction).

Figure 12:
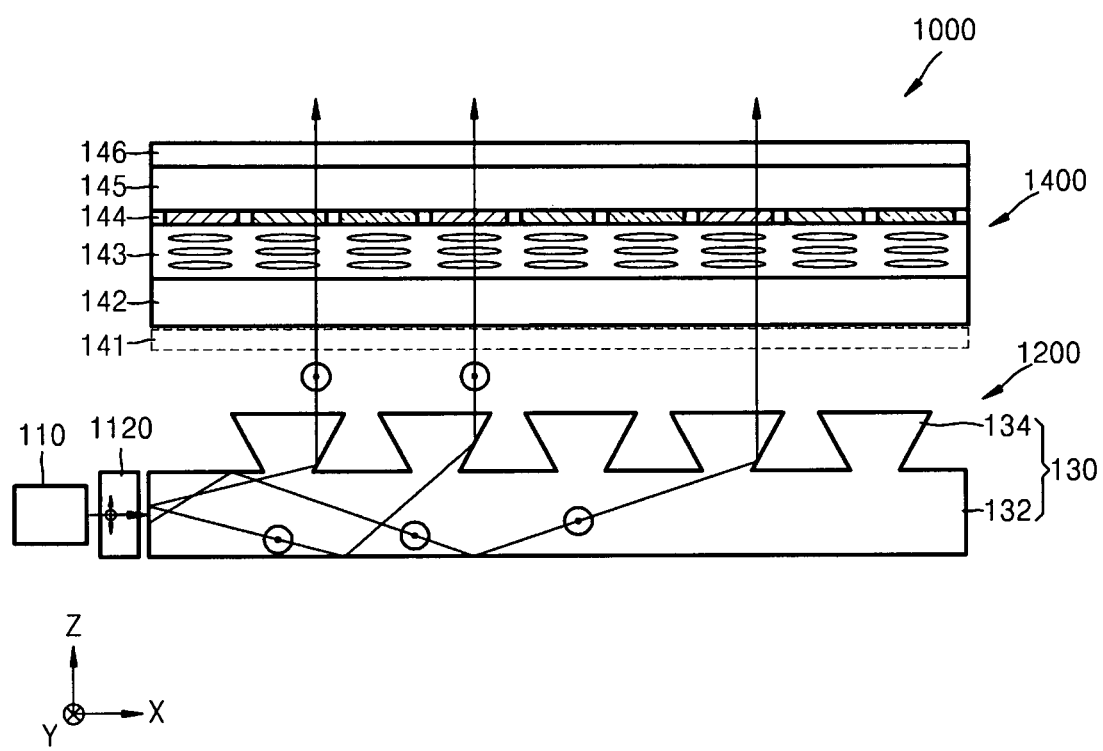
FIG. 12 is a cross-sectional view of a display apparatus according to example embodiments.

FIG. 12 is a cross-sectional view of a display apparatus 1000 according to example embodiments. Referring to FIG. 12, the display apparatus 1000 may include a backlight unit 1200 and a display panel 1400. The backlight unit 1200 may provide polarized light to the display panel 1400. The backlight unit 1200 may include a light source 110, a polarization conversion unit 1120, and an all-in-one type light guide plate 130. The backlight unit 1200 may be in the form of any one of the backlight units 1 to 11 of FIGS. 1 through 11. In this case, the backlight unit 1200 includes the appropriate elements such that polarization of emitted light is in a direction required by the display panel 1400.

The display panel 1400 may form an image by modulating the light emitted from the backlight unit 1200 according to an image signal. The display panel 1400 may include two transparent substrates 142 and 145 and a liquid crystal layer 143 interposed between the transparent substrates 142 and 145. A color filter 144 for realizing color may be disposed inside the transparent substrate 145. Although not shown, a pixel electrode and a thin film transistor (TFT) layer for controlling the liquid crystal layer 143 with respect to an individual pixel may be further disposed. A first polarization plate 141 and a second polarization plate 146 having polarization axes perpendicular to each other may be disposed outside the two transparent substrates 142 and 145. Alternatively, the first polarization plate 141 may be omitted, because polarized light having the same direction as the polarization axis of the first polarization plate 141 may be emitted from the backlight unit 1200. Because the first polarization plate 141 may be omitted, manufacturing costs of the display apparatus 1000 may be reduced. In particular, when a relatively large-sized display is realized, the effect of reducing the cost of the display apparatus 1000 becomes more evident.

As described above, in the backlight unit according to example embodiments, a polarization conversion unit may be disposed at a side of an all-in-one type light guide plate from which the light from the light source is incident. The light polarized by the polarization conversion unit may maintain its polarization state when it is emitted from the all-in-one type light guide plate. As a result, a relatively high polarization ratio may be obtained. Thus, in a display apparatus employing the backlight unit according to example embodiments, light efficiency may be increased, and the amount of polarized film required for a liquid crystal display (LCD) panel may be reduced, thereby decreasing the manufacturing costs of the display apparatus.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A backlight unit comprising:
a light source;
a polarization conversion unit configured to convert polarization of light incident from the light source; and
a light guide plate having a light guide portion and a plurality of light emitting portions protruding from an upper surface of the light guide portion, the light guide portion configured to reflect light incident through the polarization conversion unit within the light guide portion and the light emitting portions configured to emit light through specular reflection,
wherein a top cross-section of each of the plurality of light emitting portions where the light is emitted is larger than a base cross-section where the light is incident from the light guide portion,
wherein the polarization conversion unit is disposed between the light source and the light guide plate, light from the light source being incident to the light guide plate via the polarization conversion unit,
wherein the light guide portion and the light emitting portions are formed as a single body, or formed without optical boundary between the light guide portion and each of the light emitting portions,
wherein the polarization conversion unit is configured to convert the light incident from the light source into a first polarized light that is linearly polarized in a first direction, the first direction being parallel to the upper surface of the light guide portion and perpendicular to a direction from the light source toward the light guide portion, and
wherein the light guide plate is configured such that the first polarized light maintains its polarization state and is emitted from the light guide plate while being linearly polarized in the first direction.

2. The backlight unit of claim 1, wherein
the polarization conversion unit is configured to convert polarization of the incident light into a first polarized light that is linearly polarized in a first direction, and
each of the light emitting portions has a plurality of side surfaces that are parallel to the first direction.

3. The backlight unit of claim 1, wherein the polarization conversion unit includes an absorption type polarizer configured to transmit a first polarized light from the light source and to absorb a second polarized light perpendicular to the first polarized light.

4. The backlight unit of claim 1, wherein the polarization conversion unit includes:
a reflective polarizer configured to transmit a first polarized light from the light source such that the transmitted first polarized light is incident on the light guide portion and to reflect a second polarized light perpendicular to the first polarized light;

a polarization rotator configured to convert the reflected second polarized light into the first polarized light and disposed such that the converted first polarized light is incident on the light guide portion; and a light path conversion member configured to alter a light path of the second polarized light reflected by the reflective polarizer such that the reflected second polarized light is incident on the polarization rotator.

5. The backlight unit of claim 4, wherein the reflective polarizer is arranged such that an optical axis of the second polarized light reflected by the reflective polarizer is perpendicular to the upper surface of the light guide portion.

6. The backlight unit of claim 4, wherein the reflective polarizer is arranged such that an optical axis of the second polarized light reflected by the reflective polarizer is parallel to the upper surface of the light guide portion.

7. The backlight unit of claim 4, wherein
the reflective polarizer includes a cube type polarizing beam splitter, and
the light path conversion member includes a prism, the prism being bonded to the cube type polarizing beam splitter.

8. The backlight unit of claim 4, wherein the reflective polarizer includes a wire grid polarizer or a dual brightness enhancement film (DBEF).

9. The backlight unit of claim 1, wherein the polarization conversion unit includes:
a reflective polarizer configured to transmit a first polarized light from the light source such that the transmitted first polarized light is incident on the light guide portion and to reflect a second polarized light perpendicular to the first polarized light;
a quarter wave plate arranged parallel to a surface of the reflective polarizer from which the second polarized light is reflected, the quarter wave plate arranged such that the reflected second polarized light is incident thereon; and
a reflection member arranged parallel to the quarter wave plate and configured to reflect light transmitted through the quarter wave plate such that the reflected light is incident on the quarter wave plate.

10. The backlight unit of claim 9, wherein the reflective polarizer is arranged such that an optical axis of the second polarized light reflected by the reflective polarizer is perpendicular to the upper surface of the light guide portion.

11. The backlight unit of claim 9, wherein the reflective polarizer is arranged such that an optical axis of the second polarized light reflected by the reflective polarizer is parallel to the upper surface of the light guide portion.

12. The backlight unit of claim 9, further comprising:
a prism,
wherein the reflective polarizer is a cube type polarizing beam splitter, the prism is bonded to the cube type polarizing beam splitter, and the quarter wave plate and the reflection member are parallel to a diagonal side of the prism.

13. The backlight unit of claim 9, wherein the reflective polarizer includes a wire grid polarizer or a dual brightness enhancement film (DBEF).

14. The backlight unit of claim 1, wherein the polarization conversion unit includes:
a first reflective polarizer configured to transmit a first polarized light from the light source such that the transmitted first polarized light is incident on the light guide portion and to reflect a second polarized light perpendicular to the first polarized light;

a second reflective polarizer configured to transmit the second polarized light reflected by the first reflective polarizer such that the second polarized light is incident on the light guide portion and to reflect the first polarized light;
a quarter wave plate on which the second polarized light transmitted by the second reflective polarizer is incident; and
a reflection member arranged parallel to the quarter wave plate and configured to reflect light transmitted through the quarter wave plate such that the reflected light is incident on the quarter wave plate.

15. The backlight unit of claim 14, wherein the first reflective polarizer is arranged such that an optical axis of the second polarized light reflected by the first reflective polarizer is perpendicular to the upper surface of the light guide portion.

16. The backlight unit of claim 14, wherein the first reflective polarizer is arranged such that an optical axis of the second polarized light reflected by the first reflective polarizer is parallel to the upper surface of the light guide portion.

17. The backlight unit of claim 14, wherein the first and second reflective polarizers include a cube type polarizing beam splitter, a wire grid polarizer, or a dual brightness enhancement film (DBEF).

18. The backlight unit of claim 1, wherein the polarization conversion unit includes:
a reflective polarizer configured to transmit a first polarized light from the light source such that the transmitted first polarized light is incident on the light guide portion and to reflect a second polarized light perpendicular to the first polarized light;
a scattering guide member interposed between the light source and the reflective polarizer such that the second polarized light reflected by the reflective polarizer is incident on the scattering guide member, a predetermined area of a side of the scattering guide member that faces the light source being formed as an opening through which light from the light source is incident and a remaining area of the side of the scattering guide member being formed as a scattering reflection pattern portion which scatters and reflects the second polarized light reflected by the reflective polarizer; and
a focusing lens configured to focus light such that the light from the light source is incident on the scattering guide member through the opening.

19. The backlight unit of claim 18, wherein the reflective polarizer includes a wire grid polarizer, a dual brightness enhancement film (DBEF), or a multi-layer polarizing beam splitter.

20. A backlight unit comprising:
a light source;
a polarization conversion unit configured to convert polarization of light incident from the light source; and
a light guide plate having a light guide portion and a plurality of light emitting portions protruding from an upper surface of the light guide portion, the light guide portion configured to reflect light incident through the polarization conversion unit within the light guide portion and the light emitting portions configured to emit light through specular reflection,
wherein a top cross-section of each of the plurality of light emitting portions where the light is emitted is larger than a base cross-section where the light is incident from the light guide portion, wherein the polarization conversion unit is disposed between the light source and a side surface of the light guide plate, the side surface facing the light source, and wherein the polarization conversion unit includes,
- a reflective polarizer configured to transmit a first polarized light from the light source such that the transmitted first polarized light is incident on the light guide portion and to reflect a second polarized light perpendicular to the first polarized light; and
- a polyhedral scattering guide member having a first side on which light from the light source is incident, a second side on which the second polarized light reflected by the reflective polarizer is incident, a third side that includes a scattering reflection pattern portion for scattering and reflecting the second polarized light reflected from the second side, and a plurality of reflective sides.

21. A backlight unit comprising:

a light source;

a polarization conversion unit configured to convert polarization of light incident from the light source; and a light guide plate having a light guide portion and a plurality of light emitting portions protruding from an upper surface of the light guide portion, the light guide portion configured to reflect light incident through the polarization conversion unit within the light guide portion and the light emitting portions configured to emit light through specular reflection, wherein a top cross-section of each of the plurality of light emitting portions where the light is emitted is larger than a base cross-section where the light is incident from the light guide portion, wherein the polarization conversion unit is disposed between the light source and a side surface of the light guide plate, the side surface facing the light source, and wherein the polarization conversion unit includes a polarizing conversion polyhedron having an incident side on which light from the light source is incident, a polarization splitting side at which light incident through the incident side is split into a first polarized light and a second polarized light, and a plurality of reflective sides at which the second polarized light split at the polarization splitting side is reflected a plurality of times so as to be converted into the first polarized light.

22. The backlight unit of claim 21, wherein the polarizing conversion polyhedron includes:

- a cube type polarizing beam splitter configured to transmit the first polarized light from the light source such that the transmitted first polarized light is incident on the light guide portion and to reflect the second polarized light perpendicular to the first polarized light;
- a prism arranged at a side of the cube type polarizing beam splitter, a side surface of the prism being formed at a position where a side surface of the cube type polarizing beam splitter extends; and
- a triangular prism sharing the side surfaces of the prism and the cube type polarizing beam splitter.

23. A display apparatus comprising:

the backlight unit of claim 1; and a liquid crystal display (LCD) panel configured to form an image by modulating light emitted from the backlight unit.

24. The display apparatus of claim 23, wherein the LCD panel includes:

two transparent substrates;

a liquid crystal layer between the two transparent substrates; and one or more polarization plates on at least one of the two transparent substrates.

* * * * *